(12) United States Patent
Seo (10) Patent No.: US 9,474,097 B2
(45) Date of Patent: Oct. 18, 2016

(54) METHOD AND DEVICE FOR TRANSPORTING LOCATION REGISTRATION RESULT INFORMATION

(71) Applicant: Samsung Electronics Co., Ltd., Gyeonggi-do (KR)

(72) Inventor: Jongwon Seo, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 677 days.

(21) Appl. No.: 13/888,662

(22) Filed: May 7, 2013

(65) Prior Publication Data
US 2013/0303164 A1  Nov. 14, 2013

(30) Foreign Application Priority Data
May 9, 2012 (KR) .................. 10-2012-0049335

(51) Int. Cl.
H04W 4/00 (2009.01)
H04W 76/02 (2009.01)
H04W 60/00 (2009.01)

(52) U.S. Cl.
CPC ........... *H04W 76/027* (2013.01); *H04W 60/00* (2013.01); *H04W 60/005* (2013.01); *Y02B 60/50* (2013.01)

(58) Field of Classification Search
CPC ..... H04W 60/00; H04W 8/12; H04W 48/16; H04W 64/00; H04W 88/06; H04W 88/02; H04W 48/20; H04W 28/04; H04W 72/04; H04W 76/027; H04W 60/005; Y02B 60/50
USPC ............... 455/435.1, 433, 434, 456.1, 426.1, 455/456.2, 422.1, 525, 510, 450; 370/329
See application file for complete search history.

(56) References Cited

U.S. PATENT DOCUMENTS

| | | | |
|---|---|---|---|
| 2012/0170546 A1* | 7/2012 | Binzel | H04W 24/10 370/331 |
| 2012/0225670 A1* | 9/2012 | Cheng | H04W 60/00 455/456.2 |

* cited by examiner

*Primary Examiner* — Charles Appiah
*Assistant Examiner* — Alexander Yi
(74) *Attorney, Agent, or Firm* — Cha & Reiter, LLC (57) ABSTRACT

A method and device for transmitting a location registration result of a portable terminal that is adapted for connected with two or more networks includes transmitting to a first network a location registration request message for location registration, receiving a location registration rejection message including location registration rejection information from the first network when the location registration fails, and transmitting to a second network a location registration request message including the location registration rejection information. The second network can notify the portable terminal when a re-attempted connection with the first network can be performed to save on processing power for repeated re-connection attempts with the first network that will not be successful.

18 Claims, 6 Drawing Sheets

METHOD AND DEVICE FOR TRANSPORTING LOCATION REGISTRATION RESULT INFORMATION

CLAIM OF PRIORITY

This application claims the benefit under 35 U.S.C. §119 (a) from a Korean patent application filed on May 9, 2012 in the Korean Intellectual Property Office and assigned Serial No. 10-2012-0049335, the entire disclosure of which is hereby incorporated by reference in its entirety.

BACKGROUND OF THE INVENTION

1. Field of the Invention

The present invention relates to a method and apparatus for registering a location of a portable terminal. More particularly, the present invention relates to a method and apparatus for controlling a network conversion when a portable terminal fails to register to a first network.

2. Description of the Related Art

Generally, as a mobile communication technology develops, a mobile communication network is changing generation after generation, and currently, the third generation (3G) network and the fourth generation (4G) coexist.

However, the 4G network is currently centering on providing high-speed data service, and the service area of the 4G network is at the present time overlapped with the service area of the 3G network.

Further, along with the development of such mobile communication technology, a portable terminal, which may be used in a new generation network, is being developed. More particularly, in line with the current situation that the 3G and 4G networks are operated in an overlapped form, a portable terminal, which is usable in both 3G and 4G networks, is being developed. It is possible to access respective services in different network areas through such a portable terminal, but when 4G and 3G networks are overlapped, location registration is generally tried in the 4G network first.

At this time, the portable terminal first tries location registration to be provided service in the 4G network area, and thereafter, if the location registration in the 4G network area is succeeded, the portable terminal may be provided 4G network service. In contrast, in case the portable terminal fails in location registration in the 4G network, the subscriber should be provided the 3G network service by trying location registration in the 3G network. However, the 3G network cannot know the result that the portable terminal previously failed in the location registration in the 4G network, and thus the 3G network cannot effectively provide the network conversion service of the portable terminal.

In the description below, the 4G network is called a long term evolution ("LTE"), and the 3G network is called "3G".

For example, in case a terminal fails in the location registration in the LTE network, and succeeds in location registration in the 3G network, the terminal does not just remain in the 3G network in the overlapped area between the LTE network and the 3G network, but tries to move over to the LTE network again. In some cases, the terminal may continually try to move to the LTE network.

However, there may be various reasons in the location registration failure, and the terminal may continually fail in the location registration in the 4G network for a certain period of time, but if the terminal keeps continually trying location registration in the 4G network, the battery consumption of the terminal will greatly increase, and the service delay or disconnection may occur due to frequent connection conversion attempts. Further, in some cases, the frequent attempts will be a burden to the processor of the portable terminal which is performing multi-tasks.

Further, as the opposite situation of the above case, even when the mobile communication terminal fails in location registration while being connected to the 3G network and performing the service, if the location registration in the 4G network is tried, this attempted registration, which may be repeated over and over, may also be a problem.

SUMMARY OF THE INVENTION

The present invention has been made in part in view of at least some of the above problems. An exemplary object of the present invention is to provide a device and method for transmitting information including location registration failure reasons when the location registration is requested to another network, when a portable terminal tries location registration to a certain network and fails in the attempt. For example, if a portable terminal attempts location registration to a fourth generation (4G) network and fails in the attempt, the 4G network informs the terminal of the location the registration failure reasons, and the terminal transmits a location registration request message including the location registration failure reasons of the 4G network to a third generation (3G) network. As such, according to the present invention, the conversion operation of attempting location registration to the 4G network in the connection-impossible state by the terminal itself or through the 3G network command is not repeatedly performed, and the portable terminal remains in the 3G network or re-attempts connection to the 4G network in an appropriate environment.

In accordance with an exemplary aspect of the present invention, a method of transmitting a location registration result of a portable terminal preferably includes: transmitting to a first network a location registration request message for location registration; receiving a location registration rejection message including location registration rejection information from the first network when the location registration fails; and transmitting to a second network a location registration request message including the location registration rejection information.

In accordance with another exemplary aspect of the present invention, a portable terminal for performing a location registration preferably includes: a wireless communication unit including a first communication unit communicating with a first network and a second communication unit communicating with a second network; a controller for controlling to receive a location registration rejection message including location registration rejection information from the first network, and to transmit to the second network a location registration request message including the location registration rejection information; and a storage unit for storing the location registration rejection information, when a location registration request message is transmitted to the first network through the first communication unit and the location registration fails.

BRIEF DESCRIPTION OF THE DRAWINGS

The exemplary objects, features and advantages of the present invention will become more apparent from the following detailed description in conjunction with the accompanying drawings, in which.

DETAILED DESCRIPTION

Exemplary embodiments of the present invention are described herein below with reference to the accompanying drawings in detail. The same reference numbers are used throughout the drawings to refer to the same or like parts. Detailed descriptions of well-known functions and structures incorporated herein may be omitted to avoid obscuring appreciation of the subject matter of the present invention by a person or ordinary skill in the art.

The location registration rejection information of the present invention may include all information about a portable terminal requesting location registration and a network rejecting the location registration in case a location registration request message and a location registration rejection message are transmitted between the portable terminal and the network. In other words, the information may include, for example, version information of the portable terminal, information on services that may be provided by the network, the location registration failure time, location registration failure area information, information on whether there is a reason for the location registration failure (Cause Number), and the failed reason information. Further, the information may include specific causes of the failure, a solution to overcome the location registration failure, the type of the network, cell ID, electric wave environment such as electric field, and information on other connectable networks.

The present invention provides a method and device for transmitting a location registration result information in different networks. In particular, according to an exemplary embodiment of the present invention, in a communication system where a fourth generation (4G) network and a third generation (3G) network coexist, in case a portable terminal fails in location registration in the 4G network and registers location in the 3G network, the portable terminal transmits information on the failure of the location registration in the 4G network so that the 3G network may recognize the reason (or reasons) why the portable terminal failed in the location registration in the 4G network. Thus, repeated attempts to connect to the other network can be avoided, thus saving battery power and other resources being wasted in repeated attempts to connect that will most likely end without success until the problem is resolved.

Further, according to an exemplary embodiment of the present invention, in a communication system where a 4G network and a 3G network coexist, in case a portable terminal fails in location registration in the 3G network and registers location in the 4G network, the portable terminal transmits information on the failure of the location registration in the 3G network so that the 4G network may recognize the reason why the portable terminal failed in the location registration in the 4G network.

At this time, when transmitting the location registration request message, the portable terminal transmits a location registration request message including the reason of the connection failure to the network to which the portable terminal desires to be connected. Further, the portable terminal may transmit the location registration request message further including information such as the electric wave environment (wave intensity, information on whether connection is possible, etc.) of the portable terminal in addition to the connection failure reasons.

Figure 1A:
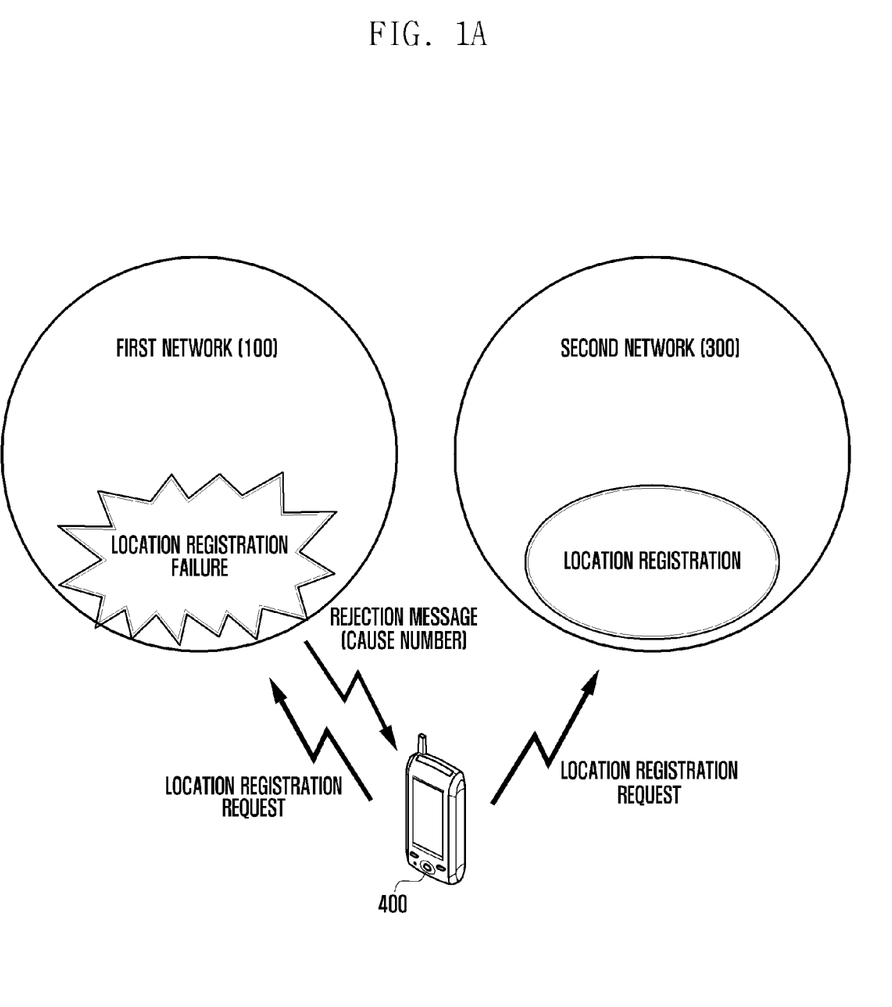
FIGS. 1A and 1B illustrate a process where, in case a portable terminal fails in location registration in one network, the portable terminal attempts location registration to another network according to an exemplary embodiment of the present invention.
Figure 1B:
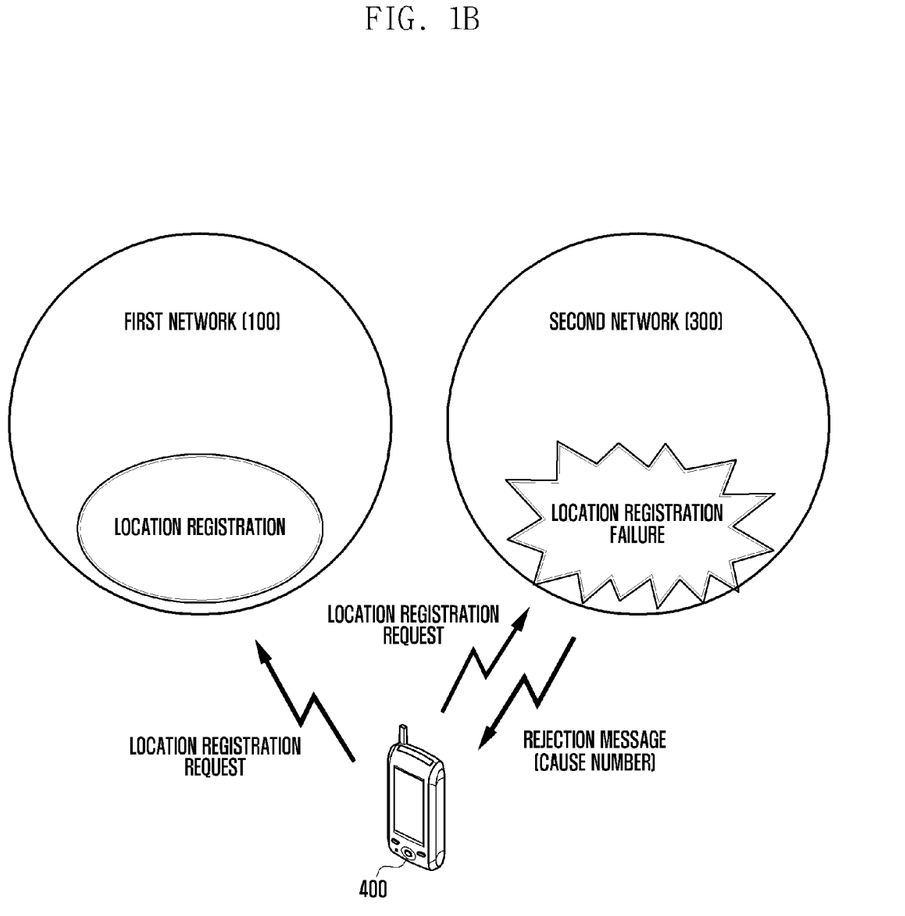

FIGS. 1A and 1B schematically illustrate the configuration of a portable terminal attempting location registration to networks and the networks according to an exemplary embodiment of the present invention.

As illustrated in FIGS. 1A and 1B, there includes a first network 100, a portable terminal 400 and a second network 300. In this exemplary embodiment of the present invention, it is assumed that the first network 100 is a fourth generation (4G) network. The first network may be a communication system such as a long term evolution (LTE) and WiBro. It also is assumed that the second network 300 is a third generation (3G) network. The 3G network may be a communication system such as a wideband code division multiple access (WCDMA), a universal mobile telecommunications system (UMTS) and a GPRS. In other words, the first network 100 may be a 4G network, and the second network 110 may be a 3G network. A person or ordinary skill in the art should understand and appreciate that the present invention will be applicable subsequent versions of networks, and is not limited to 3G and 4G.

The portable terminal 110 in this exemplary embodiment of the present invention comprises a mobile communication terminal for supporting at least a dual-band dual mode (DBDM), and is a terminal that is adapted for processing both a service provided in the first network 100 and a service provided in the second network 300. The portable terminal 400 preferably includes a modem unit and/or an RF unit, which supports the service of the first network 100, and a controller, which controls operation of an overall function of the portable terminal 400, and may wirelessly connect to the first network 100 and the second network 300, respectively, so as to use provided voice and/or data services.

The first network 100 may preferably include an enhanced node B (eNB), which is a base station for wireless section communication with the portable terminal 400, a mobility management entity (MME), a serving gateway (S-GW), a packet data network gateway (PDN Gateway), etc.

The second network 300 may include a node B, which is a base station for wireless section communication with the portable terminal 400, a radio network controller (RNC) for controlling the node B, a mobile switching center (MSC) for connecting to the wireless network controller and performing a call exchange for providing a service to the portable terminal 400, etc.

As illustrated in FIG. 1A, the portable terminal 400 attempts location registration in the first network 100, and transmits a location registration request message to the first network 100 when the location registration is attempted. At this time, if location registration in the first network 100 fails, the first network includes the connection failure reason information in a location registration rejection message, and transmits the rejection message. In other words, when the location registration rejection message is received, the portable terminal 400 may also receive information including the location registration rejection information. If location registration in the first network 100 fails, the portable terminal 400 attempts location registration in the second network 300, and when the location registration is requested, the portable terminal 400 may transmit a location registration request message on the second network 300 including the location registration rejection information received from the first network 100.

At this time, the location registration rejection information included in the location registration rejection message may include the location registration attempt and rejection message transmission/reception time, and information on whether there is a cause of location registration failure (cause number) as well as information on the area of the location registration failure, and the cause of the failure if there is a cause of the failure. Further, the rejection information may include the types of the network, cell ID, and information on the electric wave environment such as the electric field.

Table 1 below shows exemplary reasons of the location registration failure included in a location registration request message when the location registration fails. However, there are other reasons for possible failure not shown in Table. Table 1 shows only some examples of reasons of the location registration failure. This table can be stored both in the networks and the portable terminal so that only the cause number (reason code) needs to be transmitted.

TABLE 1

| Cause Number | Details |
| --- | --- |
| #3 | Illegal MS |
| #6 | Illegal ME |
| #7 | GPRS services not allowed |
| #8 | GPRS services and non-GPRS services not allowed |
| #11 | PLMN not allowed |
| #12 | Location area not allowed |
| #13 | Roaming not allowed in this location area |

FIG. 1B illustrates a situation opposite to the situation of FIG. 1A in terms of which network failed. In other words, FIG. 1B illustrates an example of an attempt to register the location in the first network in case the portable terminal has attempted location registration in the second network, but failed.

Referring now to FIG. 1B, when the portable terminal attempts location registration in the second network 300, if the attempt fails, the second network 300 includes information of the connection failure reason in the location registration rejection message, and transmits the rejection message. Then when the location registration in the second network fails, when location registration in the first network 100 is requested, the portable terminal 400 transmits the location registration rejection information received from the second network 300.

Figure 2A:
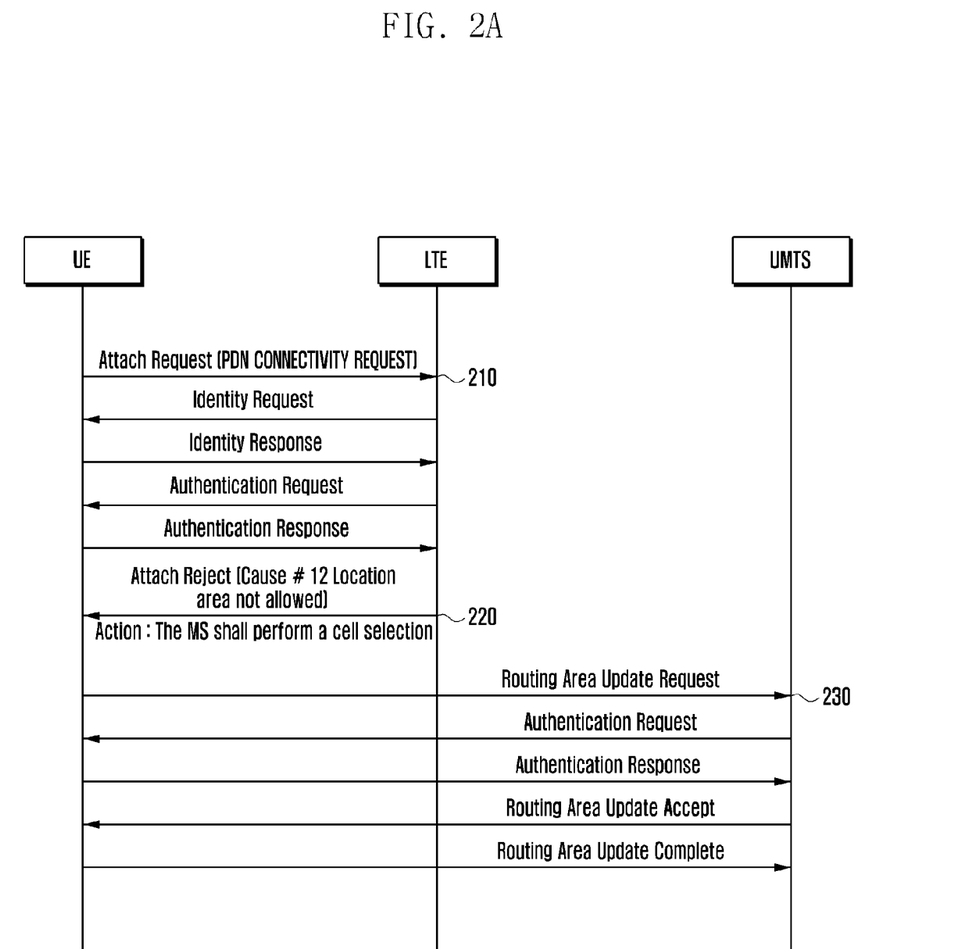
FIGS. 2A and 2B illustrate a process where, in case a portable terminal fails in location registration in a first network, the portable terminal attempts location registration in a second network according to an exemplary embodiment of the present invention.
Figure 2B:
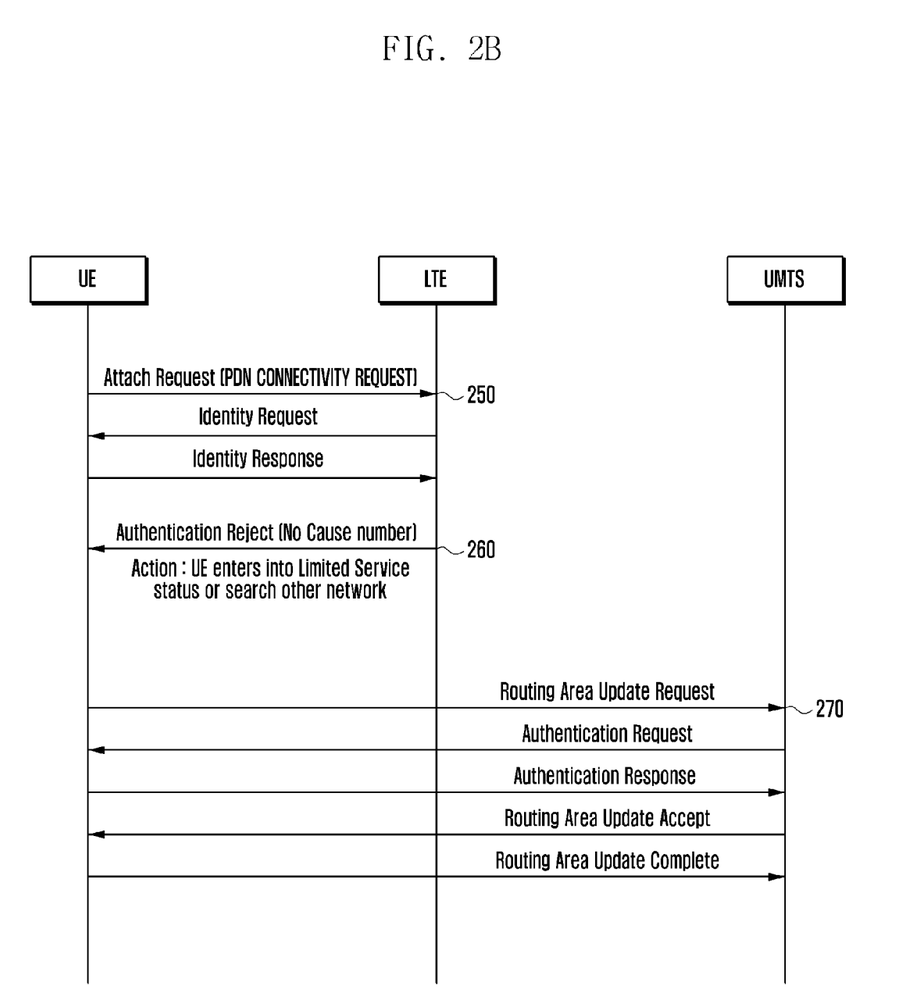

FIG. 2A illustrates an exemplary procedure between networks 100, 300 and the portable terminal 400 when there is a cause (Cause number) of the location registration failure in the location registration rejection information according to an exemplary embodiment of the present invention, and FIG. 2B illustrates a procedure between networks and the portable terminal when there is no cause of the location registration failure in the location registration rejection information. In the description below, FIGS. 2A and 2B both illustrate an example of connection to a 3G network after the portable terminal attempts a connection to a LTE network and fails in the attempt.

Referring now to FIGS. 2A and 2B, if the portable terminal attempts location registration and receives a location registration rejection message including location registration rejection information from the LTE network, the portable terminal performs an operation of searching for a second network in order to register the location in the second network, and accordingly requests a location registration in the UMTS network. At this time, the operation of searching for the second network for location registration in the second network may become a cell selection operation in the same PLMN, a suitable cell search operation for camping, or another PLMN selection operation. However, such an operation is merely exemplary, and the operation for searching for the second network of the portable terminal according to the present invention is not limited to these examples.

FIG. 2A illustrates an exemplary process where, in case the location registration rejection information includes a location registration failure reason (Cause number), the portable terminal receives the location registration rejection message including the failure reason. At this time, after the location registration request message (Attach request) is transmitted to the LTE network (S210), the location registration rejection message including Cause number #12 is received from the LTE network (S220). Here, after analyzing the received failure reasons, the portable terminal transmits a message (routing area update request) to request location registration in the second network according to the failure reason (S230). At this time, the connection failure information of the LTE network is included in the location registration request message. In other words, as illustrated, the cell selection operation is performed, and the location registration in the second network is attempted through the process. In the exemplary embodiment, the operation of the second network selection according to the failure reason and the analysis of the failure reason is not limited to the case of FIG. 2A. There may be various failure reasons and operations of selecting the second network.

Further, FIG. 2B illustrates an exemplary process where, in case there is no reason of the location registration failure in the location registration rejection information, the portable terminal receives the location registration rejection message, and a case in which the location registration rejection information is an Authentication Reject. At this time, after transmitting the location registration request message (Attach request) to the LTE network (S250), the portable terminal receives a location registration rejection message, which includes information of the location registration rejection, but does not include the failure reason, from the LTE network (S260). In this case, the portable terminal transmits a message (routing area update request) to request location registration, which does not include the failure reason, to the second network (S270). In other words, the portable terminal analyzes the location registration rejection information and performs an operation of selecting the second network according to the analyzed information, and FIG. 2B illustrates that the portable terminal performs Limited Service status or search other network operation. Through this process, the location registration to the second network is attempted. In the above exemplary embodiment, the case in which the location registration rejection information does not include the location registration failure reason and the operation of selecting the second network according to the analysis of the location registration rejection information are not limited to the example shown in FIG. 2B. Of course, there may be a case where there is no reason of the location registration failure, and an operation for selecting the second network.

Further, if the portable terminal completes location registration in the second network through the above process, the portable terminal may be provided the service by the second network. However, it is much more advantageous for the portable terminal to be provided the service of the first network, and the portable terminal may be provided the service by the second network only because of a situation according to the first network environment. For example, a user has subscribed the fee system for receiving the service by the first network, and there may be services which cannot be implemented by the service of the second network depending on the service type, or the first network is typically faster than the second network. At this time, if the portable terminal existing in the network is a type in which the first network location registration is possible, the second network gives a command to convert the location registration to the portable terminal, and the portable terminal may sometimes need to reattempt the location registration in the first network.

As such, as illustrated in FIGS. 2A and 2B, even when the portable terminal completes the location registration in the second network, if the portable terminal later receives the location registration conversion information message from the second network, the portable terminal analyzes the location registration conversion information received from the second network, and reattempts the location registration to the first network. At this time, the location registration conversion information may include a command to retransmit the location registration request message to the first network, and the information may be information about conditions in which the portable terminal may perform location registration to the first network. The latter information is information for determining whether the location registration to the first network will be reattempted based on the result of the analysis on the information by the portable terminal. In other words, in case the location registration conversion information is a command to retransmit the location registration request message, the portable terminal performs a step of transmitting the location registration request message to the first network, if the information is about a condition in which the location registration is possible, it is determined whether the location registration request message is to be transmitted to the first network.

The location registration conversion information is not limited to this example, and may include the time and/or period information in which the connection to the first network is to be reattempted, and may include information that location registration is possible to a third network.

For example, in the case of a network failure is such that no response is received at all, a time period for reattempting connection can be, for example, a fixed interval or varying intervals, for example increasing intervals with each failure, so as not to unnecessarily expend the battery.

Furthermore, the location registration conversion information may be information on the electric wave environment of the first network and whether the location registration failure reason has been resolved from the first network.

Moreover, in case the portable terminal fails in the location registration in the first network, in other words, the portable terminal receives a location registration rejection message including the location registration rejection information, the methods of informing the second network of such location rejection information may include a method of transmitting the location registration request message including the location registration rejection information to the second network and a method of transmitting the location registration rejection information from the first network to the second network.

Figure 3:
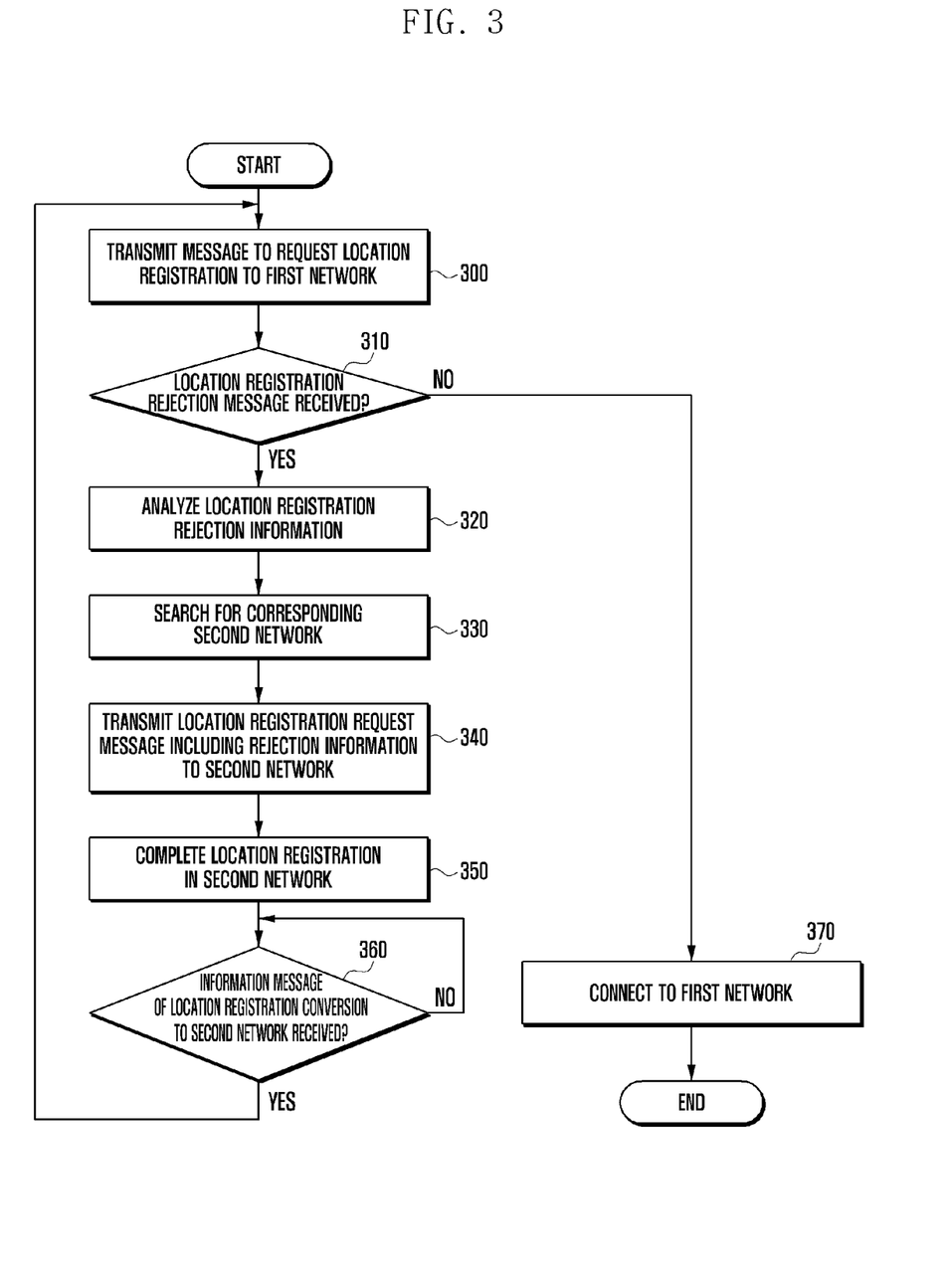
FIG. 3 is a flowchart illustrating an exemplary operational procedure of transmitting a location registration result information of a portable terminal according to an exemplary embodiment of the present invention.

FIG. 3 is a flowchart illustrating an exemplary operational procedure of transmitting location registration result information of a portable terminal according to an exemplary embodiment of the present invention.

Referring now to FIG. 3, at (S300) the portable terminal 300 transmits a location registration request message to the first network and waits for reception of a response message from the first network. At this time, if the portable terminal succeeds in the location registration (that is, the rejection message is not received), then at (S310) the portable terminal senses the success, and at (S370) registers the location in the first network. In other words, the portable terminal successfully performs the location registration to the initially desired first network and does not receive the information of the location registration result.

However, if the location registration fails and the location registration rejection message is received, then at (S310) the portable terminal senses the rejection, and at (S320) analyzes the registration rejection information including the location registration rejection information included in the rejection message, and at (S330) searches for another network (i.e. a second network) for connection therewith. If the second network is found, then at (S340) the portable terminal transmits a location registration request message including the location registration rejection information to the found second network, and if the message indicating the connection success (e.g., in the case of the 3G network, the routing area update accept message) is received, then at (S350) the portable terminal registers location in the second network. Thereafter, if at (S360) it is determined that the location registration conversion information message is received from the second network, the portable terminal senses the reception and re-performs (S300) by repeating the procedure of attempting the location registration in the first network (i.e., the process of re-transmitting the location registration request message). However, in case the location registration conversion information message is not received, the portable terminal is provided (or continues to be provided) the service of the second network in the state in which the location is registered in the second network.

Further, as described above, the exemplary embodiment of the present invention illustrates a certain system as an example of a communication system supported by the portable terminal, but the portable terminal of the present invention is not limited to the portable terminal which supports only the certain system. Hence, the portable terminal of the present invention may be applicable to a multi-mode portable terminal which may support at least two of communication systems, which have been currently commercialized and provides services, and communication systems to be developed and used in the future.

In the exemplary embodiment of the present invention, the portable terminal preferably comprises a multi-mode portable terminal for supporting at least a dual-band dual-mode (DMDM), and some non-limiting examples of such a portable terminal are all communication terminals operating according to communication protocols applicable to an International Mobile Telecommunication 2000 (IMT-2000), a time division multiple access (TDMA), a global system for mobile communication (GSM), a code division multiple access (CDMA), a universal mobile telecommunication service (UMTS), a wideband code division multiple access (WCDMA), a long term evolution (LTE), and wireless broadband Internet (WiBro), etc., and all information communication devices and multimedia devices, which may be communicated with the base stations of the mobile communication networks such as the above communication systems, such as a portable multimedia player (PMP), an MP3 player, a digital broadcast receiver, a personal digital assistant (PDA), a smart phone, a mobile phone, a laptop or notebook computer, etc.

Figure 4:
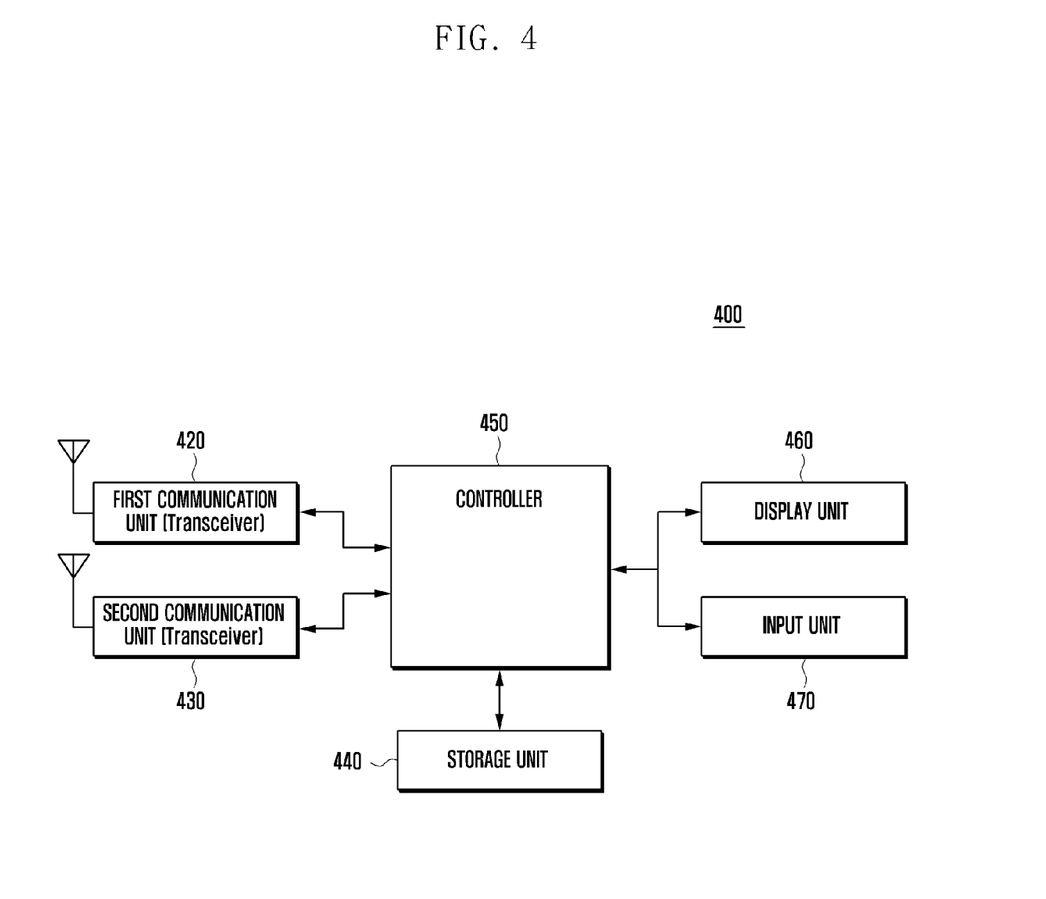
FIG. 4 is a block diagram schematically illustrating an exemplary configuration of a portable terminal according to an exemplary embodiment of the present invention.

FIG. 4 illustrates a configuration of a device for transmitting the location registration result according to an exemplary embodiment of the present invention. Likewise, the portable terminal 400 according to an exemplary embodiment of the present invention preferably supports two or more communication connection modes.

Referring now to FIG. 4, the portable terminal 400 may activate both the first communication unit 420 and the second communication unit 430, and may activate one of the first communication unit 420 and the second communication unit according to user's selection or a preset priority. The first and second communication units comprise hardware such as a transceiver to transmitting and receiving communications via a wireless protocol. In an exemplary embodiment, each of the communication units may operate under a different protocol or communication transmission frequency. At this time, after activating a certain communication module, if connection with the wireless network is not made, another non-activated communication module may be activated so that connection to the corresponding wireless network may be attempted. Likewise, the portable terminal 400 of the present invention may simultaneously process the services received through the 4G network and the 3G network.

It should be noted that the configuration of the portable terminal and the operations thereof according to an exemplary embodiment of the present invention is clearly not limited to the above stated description, and may be applicable for use various environments.

The portable terminal 400 according to an exemplary embodiment of the present invention 400 may include a first communication unit 420 for a communication service of the 4G network, a second communication unit 430 for a communication service of the 3G network, a storage unit 440 comprising a non-transitory machine readable medium for storing location registration rejection information and the information on operation of searching for the second network in response to the rejection information, and a controller 450 for controlling the method of transmitting the location registration information of the present invention. The controller comprises hardware and preferably includes a processor or microprocessor that is configured for operation.

The first communication unit 420 may include a duplexer for dividing and processing each frequency transmitted from the network, a wireless transmission and reception unit for dividing transmitted and received electric waves by predetermined frequency bands, and a modem unit for processing wireless section protocols with the 4G network.

The second communication unit 430 may include a duplexer for dividing and processing each frequency transmitted from the network, a wireless transmission and reception unit for dividing transmitted and received electric waves by predetermined frequency bands, and a modem unit for processing wireless section protocols with the 3G network.

In this example, the first communication unit 420 performs a communication including message transmission and reception for the location registration with the first network, and the second communication unit 430 performs a communication including message transmission and reception for the location registration with the second network.

The storage unit 440 stores application programs and various data which are needed for performing the functions of the portable terminal 400 including information for performing the location registration process. In particular, in the present exemplary embodiment, the storage unit 4440 stores the location registration rejection information or location registration failure reasons received from the first network (or the second network), and stores the operation of selecting the second network (or the first network) corresponding to the location registration rejection information. The operation of selecting the second network (or the first network) in response to the failure reason may include a cell selection operation within the same PLMN, a camping-possible suitable cell search operation, and another PLMN selection operation.

The storage unit 440 may include a Subscriber Identity Module (SIM) card for storing identification information for identifying the portable terminal 400, and may include a USIM card which has both a SIM card function and a Universal Integrated Circuit Card (UICC) function, and is generally used in the 3 G communication network. Further, the storage unit 440 comprises a non-transitory storage module which is usable in the 4 G communication network. Further, the storage unit 440 may comprise a module in a card type which is manually user-detachable from the portable terminal 400, and may include a memory chip. The memory chip may store subscriber information including user's personal phone number, password, and fee charge information, and identification information, which is required for receiving services from the network while the portable terminal 400 is operated, such as an International Mobile Subscriber Identity (IMSI) used to identify the subscriber as subscriber's unique identification information, a temporary mobile subscriber identity (TMSI) allocated from the network to use services provided through the communication network, and a packet temporary subscriber identity (P-TMSI).

The display unit 460 displays screen data generated during the performance of the program, and displays an input key operation state by user, etc. The display unit 460 may be formed as a liquid crystal display (LCD), and in case the LCD is formed as a touch screen, the display unit 460 may also perform a function of the input unit 470. The display unit may be comprised of, for example, a thin-film technology. The input unit 470 receives the number and letter information and transmits to the controller 450 a signal inputted in connection with the setting of various functions and the function control of the terminal 400. Further, the input unit 470 may be formed as a touch pad or a general key array or a combination thereof depending on the provided type of the terminal 400.

The controller 450, which comprises hardware, is configured to control the first communication module 420 and the second communication module 430, and overall operation and functions of the portable terminal 400. Further, the controller 450 controls the input and output unit, the storage unit 440, and the signal flow between the components. The controller 450 analyzes the location registration rejection message of the portable terminal 400 and the rejection information included therein, and processes the corresponding second network search process. In other words, according to the above analysis, instructions/commands for the operation are stored in and/or retrieved from the storage unit 440, and as such, the second network is searched and the portable terminal transmits a message to request the location registration in the second network by the control of the controller.

At this time, the message to request the location registration in the second network may include the rejection information, and the message including the information may be transmitted. The location registration rejection information may include the time of the attempt to register location in the first network and the transmission and reception of the rejection message, information of the location registration failure area and information on whether there is a reason of the location registration failure (Cause number), and information on the reason of the failure if there is such information, and may also include the type of the network, cell ID and information on the electric wave such as the electric field.

Further, in case the location registration conversion information message is received through the second communication unit 430, if the location registration conversion information message is a command to transmit the message to request the location registration in the first network, the controller 450 gives a command to covert the location registration to the first network. In other words, the message to request the location registration in the first network is processed thorough the first communication unit 420. In case the location registration conversion information message comprises information on the condition in which the location registration in the first network is possible, it is determined whether the command to covert the location registration to the first network will be given accordingly. In other words, it is determined whether the location registration in the first network will be re-attempted, and then it is determined whether to transmit the message to request the location registration.

In case a service is requested from a certain network (e.g., a call reception) or a service to a certain network (e.g., a call connection) is requested from user, the requested wireless network is determined. Further, the controller 450 controls connection to the wireless network using the communication unit (the first communication unit 420 or the second communication unit 430) corresponding to the determined wireless network.

For example, when obtaining one of the 3G network and the 4G network, the controller 450 controls a connection to the communication service using the communication unit 420 and 430 of the obtained wireless network. When obtaining both the 3G network and the 4G network, one corresponding communication module according to a preset priority mode is controlled so that connection to the wireless network may be controlled.

Further, the controller 450 controls operation of the first communication unit 420 and the second communication unit 430 according to the state of the communication service corresponding to the obtained wireless networks. To this end, the controller 450 may be configured with software by a software module which may be explained by entities. For example, the software entities executed in the controller may be included. Some examples of such entities are an entity for processing a communication service with the 3G network and an entity for processing a communication service with the 4G network. However, in any event under the broadest reasonable interpretation, the claimed invention is not software per se under any scenario and constitutes a statutory invention.

The first communication unit 420 and the second communication unit 430 may provide each communication interface so that the portable terminal may communicate with each of the 4G network and the 3G network under the control of the controller 450.

According to a method and device for transmitting location registration result information suggested in the present invention, if a portable terminal, which is connectable to 3G and 4G networks, fails in location registration in a certain network, the portable terminal receives location registration rejection information transmitted from the certain network, and when the portable terminal attempts connection to another network, the portable terminal transmits a location registration request message including the received rejection information. In this case, the network, which receives the location registration request message, may understand network connection failure information and failure reasons of the portable terminal, and thus the terminal does not need to repeatedly perform the conversion operation of attempting location registration to the network in the connection-impossible state by the terminal itself or a network command, and may remain in the connected network or reattempt connection to the connection-failed network in an appropriate environment. For example, if a portable terminal fails in location registration in a 4G network, the portable terminal transmits a location registration request message including failure reasons to a 3G network. If the 3G network determines through such information that the portable terminal is connectable to a 4G network, the 3G network can send a command to re-attempt location registration to the 4G network, or if the connection is impossible, the 3G network can send a command to the portable terminal to maintain the connection with the 3G network so that the portable terminal does not repeatedly attempt reconnection to the 4G network when such attempts will not result in a successful connection with the 4G network.

The above-described methods according to the present invention can be implemented in hardware, firmware or as software or computer code that is stored in a recording medium such as a CD ROM, flash, EPROM, EEPROM, RAM, a floppy disk, thumbnail drive, a hard disk, or a magneto-optical disk or computer code downloaded over a network originally stored on a remote recording medium and then stored on a non-transitory medium and loaded into hardware such as a processor or microprocessor. The machine executable code stored on the non-transitory machine readable medium can be stored on a local recording medium, and loaded into hardware such as a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. In addition, an artisan understands and appreciates that a "processor", "microprocessor" or "unit" constitutes hardware in the claimed invention. Finally, the claimed invention can include the use of a location information server comprising more than one server, such as a proxy server. Under the broadest reasonable interpretation, the claimed invention constitutes statutory subject matter in view of 35 U.S.C. §101 and does not constitute software per se.

Although exemplary embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims.

What is claimed is:

1. A method by a mobile terminal for transmitting a location registration result of the mobile terminal, the method comprising:

transmitting by the mobile terminal a first location registration request message for location registration to a first cellular network;

receiving by the mobile terminal a location registration rejection message including location registration rejection information when the location registration fails, from the first cellular network; and transmitting by the mobile terminal a second location registration request message including the location registration rejection information received from the first cellular network, to a second cellular network;

completing by the mobile terminal the location registration in the second cellular network when a message indicating a successful connection with the second cellular network to allow location registration in the second cellular network is received;

after the location registration is completed, receiving by the mobile terminal a message including location registration conversion information generated and transmitted by the second cellular network when the second cellular network determines that the first cellular network is communicatively connectable to the mobile terminal based on the location registration rejection information; and wherein, by the mobile terminal, the connection with the second cellular network is maintained if the message including the location registration conversion information is not received from the second cellular network and the message including the location registration conversion information is received by the mobile terminal if the connection conversion to the first cellular network is available when the second cellular network determines that a current state of the first network will accept a location registration request from the mobile terminal, performing by the mobile terminal a connection conversion to the first cellular network based on the location registration conversion information.

2. The method of claim 1, wherein the location registration rejection information includes at least one of version information of the terminal, information on services provided by the first cellular network, a location registration failure time, location registration failure area information, information on whether there is a reason for the location registration failure, a location registration failure reason, a solution to overcome the location registration failure, a type of the first cellular network, cell ID, electric wave environment information regarding the first cellular network, and information on other connectable cellular networks.

3. The method of claim 2, wherein each of a plurality of location registration failure reasons corresponds to a specific cause number stored in a table in the terminal so that first cellular network transmits the cause number to the mobile terminal.

4. The method of claim 1, further comprising:
analyzing the location registration rejection information after receiving the location registration rejection message; and selecting the second cellular network corresponding to the location registration rejection information.

5. The method of claim 1, wherein the performing of the connection conversion to the first cellular network comprises re-transmitting the first location registration request message to the first cellular network when the location registration conversion information comprises a command to retransmit a message to request location registration to the first cellular network.

6. The method of claim 1, wherein the performing of the connection conversion to the first cellular network comprises transmitting the message to request the location registration to the first cellular network when the location registration conversion information includes a condition indicating that location registration to the first cellular network is allowed.

7. A mobile terminal for performing a location registration, the mobile terminal comprising:

a wireless communication unit of the mobile terminal configured to communicate with a first cellular network and a second cellular network; and a controller of the mobile terminal configured to control:

transmitting a first location registration request message for location registration to a first cellular network, receiving a location registration rejection message including location registration rejection information when the location registration fails, from the first cellular network, transmitting a second location registration request message including the location registration rejection information received from the first cellular network, to a second cellular network, completing the location registration in the second cellular network when a message indicating a successful connection with the second cellular network to allow location registration in the second cellular network is received, after the location registration is completed, receiving a message including location registration conversion information generated and transmitted by the second cellular network when the second cellular network determines that the first cellular network is communicatively connectable to the mobile terminal based on the location registration rejection information, and wherein, by the mobile terminal, the connection with the second cellular network is maintained if the message including the location registration conversion information is not received from the second cellular network, and the message including the location registration conversion information is received by the mobile terminal if the connection conversion to the first cellular network is available when the second cellular network determines that a current state of the first network will accept a location registration request from the mobile terminal, and performing a connection conversion to the first cellular network based on the location registration conversion information.

8. The terminal of claim 7, wherein the location registration rejection information includes at least one of version information of the terminal, information on services provided by the first cellular network, a location registration failure time, location registration failure area information, information on whether there is a reason for the location registration failure, a location registration failure reason, a solution to overcome the location registration failure, a type of the first network, cell ID, electric wave environment information regarding the first cellular network, and information on other connectable cellular networks.

9. The mobile terminal of claim 8, wherein each of a plurality of location registration failure reasons in the location registration rejection information corresponds to a specific cause number stored in a table in the mobile terminal.

10. The mobile terminal of claim 8, wherein the controller is further configured to control analyzing the location registration rejection information, and selecting the second cellular network corresponding to the location registration rejection information.

11. The mobile terminal of claim 7, wherein, if the location registration conversion information includes a command to retransmit a message to request location registration to the first cellular network, the controller is configured to re-transmit the first location registration request message to the first cellular network.

12. The mobile terminal of claim 7, wherein the controller is further configured to determine whether location registration should be converted when the location registration conversion information indicates that connection with the first cellular network is allowed.

13. A method by a base station in a second cellular network for transmitting a location registration result of a mobile terminal, the method comprising:
    receiving, by the base station in the second cellular network, a location registration request message including location registration rejection information from the mobile terminal, the location registration rejection information is transferred from a first cellular network to the mobile terminal when location registration in the first cellular network fails after the mobile terminal transmits a first location registration request message for location registration to the first cellular network;
    performing by the base station location registration of the mobile terminal in the second cellular network;
    transmitting by the base station a message indicating a successful connection with the second cellular network to allow location registration in the second cellular network, to the mobile terminal;
    generating by the base station location registration conversion information when the second cellular network determines that the first cellular network is communicatively connectable to the mobile terminal based on the location registration rejection information received from the mobile terminal;
    wherein, if the second cellular network does not send the message including the location registration conversion information to the mobile terminal, the mobile terminal will maintain the connection with the second cellular network; when the second cellular network determines that a current state of the first network will accept a location registration request from the mobile terminal, the connection conversion to the first cellular network is available, and
    the message including the location registration conversion information is transmitted to the mobile terminal by the second cellular network for the mobile terminal to perform a connection conversion to the first cellular network based on the location registration conversion information.

14. The method of claim 13, wherein the location registration rejection information includes at least one of version information of the mobile terminal, information on services provided by the first cellular network, a location registration failure time, location registration failure area information, information on whether there is a reason for the location registration failure, a location registration failure reason, a solution to overcome the location registration failure, a type of the first cellular network, cell ID, electric wave environment information regarding the first cellular network, and information on other connectable cellular networks.

15. The method of claim 13, wherein the location registration conversion information includes at least one of a command to retransmit a location registration request message to the first cellular network, and information about conditions in which the mobile terminal performs location registration to the first cellular network.

16. A base station in a second cellular network for transmitting a location registration result of a mobile terminal, the base station comprising:
    a wireless communication unit configured to communicate with the mobile terminal; and
    a controller of the base station in the second cellular network configured to control:
    receiving a location registration request message including location registration rejection information from the mobile terminal, the location registration rejection information is transferred from a first cellular network to the mobile terminal when location registration in the first cellular network fails after the mobile terminal transmits a first location registration request message for location registration to the first cellular network;
    performing location registration of the mobile terminal in the second cellular network;
    transmitting a message indicating a successful connection with the second network to allow location registration in the second cellular network, to the mobile terminal;
    generating location registration conversion information when the second cellular network determines that the first cellular network is communicatively connectable to the mobile terminal based on the location registration rejection information;
    wherein, if the second cellular network does not send the message including the location registration conversion information to the mobile terminal, the mobile terminal will maintain the connection with the second cellular network;
    when the second cellular network determines that a current state of the first network will accept a location registration request from the mobile terminal, the connection conversion to the first cellular network is available, and
    the message including the location registration conversion information is transmitted to the mobile terminal by the second cellular network for the mobile terminal to perform a connection conversion to the first cellular network based on the location registration conversion information.

17. The base station of claim 16, wherein the location registration rejection information includes at least one of version information of the mobile terminal, information on services provided by the first cellular network, a location registration failure time, location registration failure area information, information on whether there is a reason for the location registration failure, a location registration failure reason, a solution to overcome the location registration failure, a type of the first cellular network, cell ID, electric wave environment information regarding the first cellular network, and information on other connectable cellular networks.

18. The base station of claim 16, wherein the location registration conversion information includes at least one of a command to retransmit a location registration request message to the first cellular network, and information about conditions in which the terminal performs location registration to the first cellular network.

* * * * *